(12) United States Patent
Pangborn et al.

(10) Patent No.: US 8,850,101 B2
(45) Date of Patent: *Sep. 30, 2014

(54) SYSTEM AND METHOD TO REDUCE MEMORY ACCESS LATENCIES USING SELECTIVE REPLICATION ACROSS MULTIPLE MEMORY PORTS

(71) Applicant: Cavium, Inc., San Jose, CA (US)

(72) Inventors: Jeffrey A. Pangborn, Saratoga, CA (US); Gregg A. Bouchard, Georgetown, TX (US); Rajan Goyal, Saratoga, CA (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/023,953

(22) Filed: Sep. 11, 2013

(65) Prior Publication Data

US 2014/0013061 A1    Jan. 9, 2014

Related U.S. Application Data

(63) Continuation of application No. 13/280,738, filed on Oct. 25, 2011, now Pat. No. 8,560,757.

(51) Int. Cl.
*G06F 12/00* (2006.01)
*G06F 12/02* (2006.01)
*G06F 12/10* (2006.01)
*G06F 12/06* (2006.01)

(52) U.S. Cl.
CPC ...... *G06F 12/1018* (2013.01); *G06F 2212/174* (2013.01); *G06F 2212/2532* (2013.01); *G06F 12/0292* (2013.01); *G06F 12/06* (2013.01)
USPC ............... 711/5; 711/118; 711/154; 711/216; 711/206; 711/E12.058; 711/E12.068

(58) Field of Classification Search
USPC .............. 711/5, 118, 154, 216, 206, E12.058, 711/E12.068
See application file for complete search history.

(56) References Cited

U.S. PATENT DOCUMENTS 5,548,724 A    8/1996    Akizawa et al.
6,467,002 B1    10/2002    Yang
(Continued)

FOREIGN PATENT DOCUMENTS

WO    WO 2006/031551 A2    3/2006

OTHER PUBLICATIONS

International Search Report and Written Opinion of the International Searching Authority in International Application No. PCT/US2012/057269, entitled "System and Method to Reduce Memory Access Latencies Using Selective Replication Across Multiple Memory Portsdated" Feb. 5, 2013.

(Continued)

*Primary Examiner* — Larry MacKall
(74) *Attorney, Agent, or Firm* — Hamilton, Brook, Smith & Reynolds, P.C.

(57) ABSTRACT

In one embodiment, a system comprises a plurality of memory ports. The memory ports are distributed into a plurality of subsets, where each subset is identified by a subset index. The system further comprises a first address hashing unit configured to receive a request including at least one virtual memory address. Each virtual memory address is associated with a replication factor, and the virtual memory address refers to graph data. The first address hashing unit translates the replication factor into a corresponding subset index based on the virtual memory address, and converts the virtual memory address to a hardware based memory address. The hardware based address refers to data in the memory ports within a subset indicated by the corresponding subset index.

30 Claims, 8 Drawing Sheets

(56) References Cited

U.S. PATENT DOCUMENTS

| | | | |
|---|---|---|---|
| 6,820,215 | B2 | 11/2004 | Harper et al. |
| 6,888,836 | B1 | 5/2005 | Cherkasova |
| 7,558,925 | B2 | 7/2009 | Bouchard et al. |
| 2010/0114973 | A1 | 5/2010 | Goyal |

OTHER PUBLICATIONS

"Single Chip 8 to 32-core OCTEON II™ MIPS64 Processors Provide up to 48 GHz of 64-bit Compute with Unmatched L3-L7 Data and Security Acceleration to Deliver 40Gbps of throughput While Slashing Power Consumption for Next Generation Internet Infrastructure Applications," *Cavium Network Unveils OCTEON II CN68XX—Industry's Highest-Performance Multi-Core Processors for Energy-Efficient Data Center, Mobile Internet and the Borderless Enterprise* (May 2010).

International Preliminary Report for International Application No. PCT/US2012/057269, entitled "System and Method to Reduce Memory Access Latencies Using Selective Replication Across Multiple Memory Portsdated", dated Apr. 29, 2014.

| 500 ↘ | |
|---|---|
| GRAPH NUMBER (502) | STARTING VIRTUAL ADDRESS FOR GRAPH (504) |
| 0 | 0x0 |
| 1 | 0x100 |
| 2 | 0x200 |
| 3 | 0x400 |
| 4 | 0x1000 |
| 5 | 0x4000 |
| 6 | 0x8000 |

FIG. 5A

| 550 ↘ | |
|---|---|
| VIRTUAL MEMORY ADDRESS (552) | PORT (554) |
| 0x0 | 0 |
| 0x1 | 1 |
| 0x2 | 2 |
| 0x3 | 3 |
| 0x4 | 0 |
| 0x1000 | 3 |
| 0x1001 | 2 |
| 0x1002 | 1 |
| 0x1003 | 0 |
| 0x1004 | 3 |

FIG. 5B

| REPLICATION FACTOR 802 | BITS [8:7] OF THE MODIFIED VIRTUAL MEMORY ADDRESS 804 | SUBSET # 806 | ELIGIBLE MEMORY PORTS 808 |
|---|---|---|---|
| 4x | 2'bxx | S1 | 0, 1, 2, AND 3 |
| 2x | 2'b0x | S2 | 0 AND 1 |
| 2x | 2'b1x | S3 | 2 AND 3 |
| 1x | 2'b00 | S4 | 0 |
| 1x | 2'b01 | S5 | 1 |
| 1x | 2'b10 | S6 | 2 |
| 1x | 2'b11 | S7 | 3 |

FIG. 8A

| REPLICATION FACTOR 852 | BIT [7] OF THE MODIFIED VIRTUAL MEMORY ADDRESS 854 | SUBSET # 856 | ELIGIBLE MEMORY PORTS 858 |
|---|---|---|---|
| 2x | 1'bx | S1 | 0 AND 1 |
| 1x | 1'b0 | S2 | 0 |
| 1x | 1'b1 | S3 | 1 |

FIG. 8B

SYSTEM AND METHOD TO REDUCE MEMORY ACCESS LATENCIES USING SELECTIVE REPLICATION ACROSS MULTIPLE MEMORY PORTS

RELATED APPLICATION

This application is a continuation of U.S. application Ser. No. 13/280,738, filed Oct. 25, 2011, now U.S. Pat. No. 8,560,757.

The entire teachings of the above application are incorporated herein by reference.

BACKGROUND

For many computer systems, memory latency is a significant obstacle when accessing a memory address. Over 90% of the time required of a computer system to execute a particular algorithmic function may be spent waiting to receive a response to a read request because of memory latency. When the computer system's algorithm accesses memory, the system dispatches the read request to the memory, waits for the memory port to return the requested data, and then the algorithm applies the returned data. An algorithm may frequently request data from a subsequent memory address based on the returned data. Applying the returned data and issuing a subsequent memory read request can take little time compared to the time spent waiting for the memory port to return the requested data. Therefore, reducing memory latency can improve system performance in systems that rely heavily on memory access, such as the system described above. When multiple instances of the algorithm operate independently in parallel without any interactions, several read requests to the memory ports may be pending at any given time. The latency one algorithm experiences is then dependent upon the read request frequency of the other units performing the same algorithm because access to a memory port is serial.

SUMMARY

Multiple memory ports can lower overall memory latency. Data can be stored uniquely across the various memory ports. In addition, using multiple memory ports allows for more total computer system memory than using a single memory port because each memory port has a maximum capacity it can support. However, in this configuration, independently issued read requests may be in a non-uniform distribution across the memory ports, which increases realized memory port read latency.

Modifying the memory ports such that the memories attached to all the memory ports contain the same data reduces memory latency, but sacrifices the number of memory locations in the system which can store unique data. In such a system, the memories on all memory ports contain identical data and a memory replication controller directs arriving read requests to the least-busy memory port, which distributes read requests nearly-uniformly among the ports, assuming all memory ports service read requests with approximately the same latency.

In one embodiment, a system comprises a plurality of memory ports. The memory ports are distributed into a plurality of subsets, where each subset is identified by a subset index and each of the memory ports have an individual wait time based on a respective workload. The system further comprises a first address hashing unit configured to receive a read request including a virtual memory address. The virtual memory address is associated with a replication factor, and the virtual memory address refers to graph data. The first address hashing unit translates the replication factor into a corresponding subset index based on the virtual memory address, and converts the virtual memory address to a hardware based memory address. The hardware based address refers to graph data in the memory ports within a subset indicated by the corresponding subset index. The system further comprises a memory replication controller configured to direct read requests to the hardware based address to the one of the memory ports within the subset indicated by the corresponding subset index with a lowest individual wait time.

In one embodiment, a second address hashing unit is configured to receive a write request for data including at least one virtual memory address, and convert each virtual memory address to a hardware based memory address, each hardware based memory address referring to a separate one of the memory ports. The first and second address hashing units are configured to modify the order requests are distributed across the ports. The first and second address hashing units are configured to convert any given virtual memory address to a predetermined hardware based memory address.

A method comprises distributing a plurality of memory ports into a plurality of subsets, each subset identified by a subset index, each of the memory ports having an individual wait time based on a respective work load. The method further comprises receiving a read request, at a first address hashing unit, with a virtual memory address, the virtual memory address associated with a replication factor, the virtual memory address referring to graph data. The method further comprises translating, at the first address hashing unit, the replication factor into a corresponding subset index based on the virtual memory address. The method further comprises converting, at the first address hashing unit, the virtual memory address to a hardware based memory address, the hardware based address referring to a separate one of the memory ports within a subset indicated by the corresponding subset index. The method further comprises directing read requests, in a memory replication controller, to the hardware based address to one of the memory ports with a lowest individual wait time.

In one embodiment, the method can further comprise receiving, at a second address hashing unit, a write request for graph data including at least one virtual memory address and converting, at the second address hashing unit, each virtual memory address to a hardware based memory address, each hardware based memory address referring to a separate one of the plurality of memory ports.

The first address hashing unit is coupled to a plurality of inspection engines and a memory replication controller, wherein each inspection engine is configured to issue read requests to the memory replication controller through the first address hashing unit. The second address hashing unit is coupled with the cache controller, wherein the cache controller is configured to issue read and write requests to the plurality of memory ports through the second address hashing unit through the second address hashing unit. The first and second address hashing units are configured to convert any given virtual memory address to a predetermined hardware based memory address. The first and second address hashing units modify the order virtual memory address requests are distributed across the plurality of memory ports.

The memory ports are configured to store data in a hardware based memory address. Each of the hardware based memory addresses refers to a separate one of the memory ports within a subset and has a same relative address within each of the memory ports.

The replication factor indicates a number of replications of a data structure in the memory ports. The number of replications may be an exponential power of two. Within a given graph, graph data nodes with the same replication factor are stored in the virtual memory in a group of addresses. The graph data nodes are assigned virtual memory addresses in at least one of ascending and descending order according to their replication factor. The replication factor of a given graph data is determined by a prediction of the frequency of the given graph data will be read.

A host or software may reserve sequential virtual memory addresses for each replication of a plurality of graph data. The subset index includes either bits of the virtual memory address or bits of the modified virtual memory address to access the graph data in the memory ports.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present invention.

FIG. 5A is a table illustrating a linear address space scheme for storing a graph in software.

FIG. 5B is a table illustrating a conversion of a virtual memory address to a memory port.

FIG. 8A is a table illustrating an address hashing unit with four memory ports attached.

FIG. 8B is a table illustrating an address hashing unit with two memory ports attached.

DETAILED DESCRIPTION

A description of example embodiments follows.

Before describing example embodiments of the present invention in detail, an example network security processor in which the embodiments may be implemented is described immediately below to help the reader understand the inventive features of the present invention.

Figure 1:
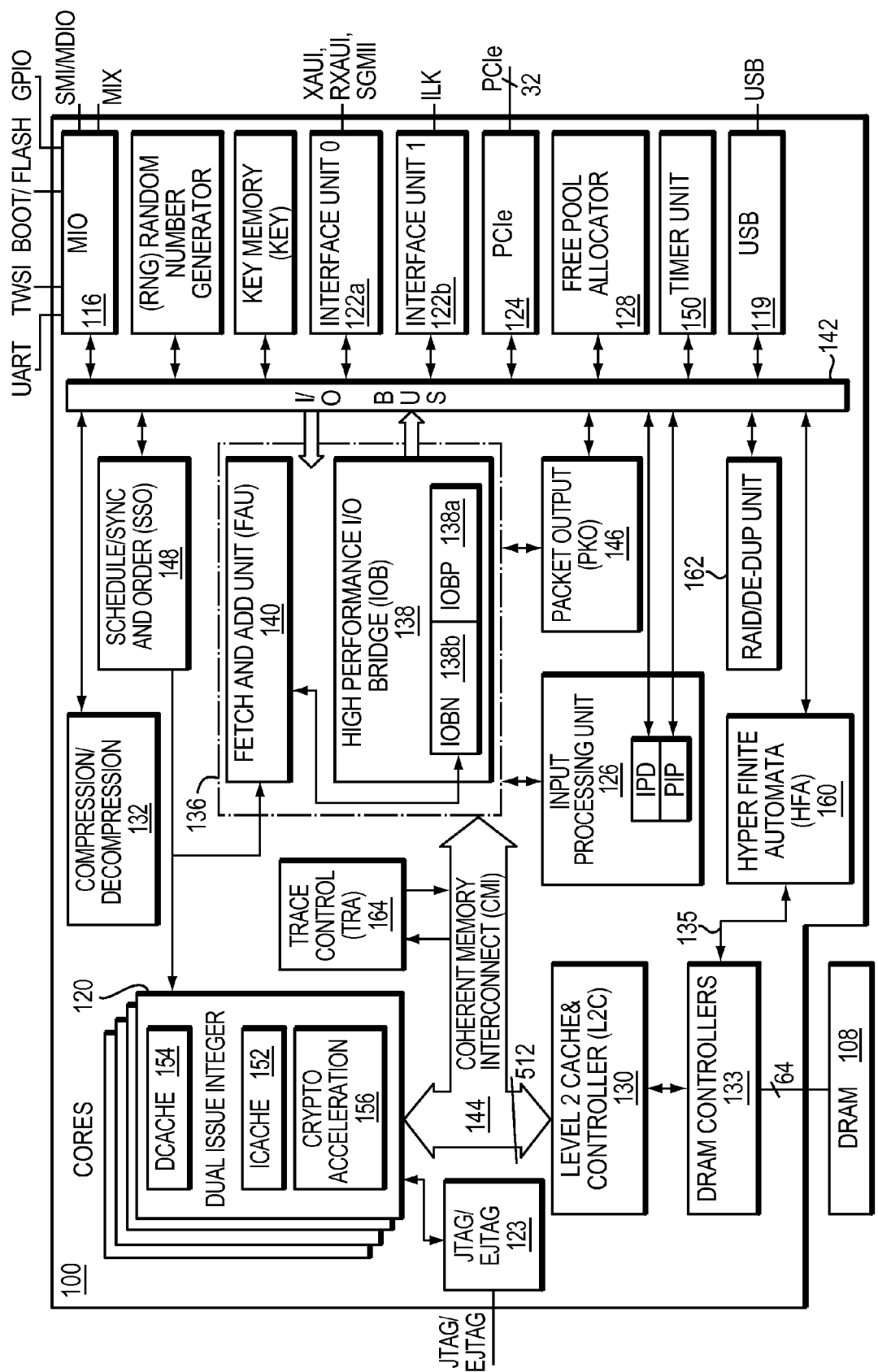
FIG. 1 is a block diagram of a network services processor.

FIG. 1 is a block diagram of a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122a and 122b. A packet can also be received by a PCIe interface 124. The interface units 122a and 122b perform pre-processing of the received packet by checking various fields in the L2 network protocol header included in the received packet and then forward the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache memory 130 or external DRAM 108. Preferably, the packet data is written into the memories in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA inspection engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA inspection engine.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138*a* and an I/O Bus Bridge (IOBN) 138*b*. The I/O Packet Bridge 138*a* is configured to manage the overall protocol and arbitration and provide coherent I/O portioning with primarily packet input and output. The I/O Bus Bridge 138*b* is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 804 two-wire Management Data I/O Interface (MDIO), Serial Management Interrupt (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services processor 100 may also include a Joint Test Action Group (JTAG) Interface 123 supporting the MIPS EJTAG standard. According to the JTAG and MIPS EJTAG standards, a plurality of cores within the network services processor 100 will each have an internal Test Access Port (TAP) controller. This allows multi-core debug support of the network services processor 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI 144 is coupled to a trace control unit 164 configured to capture bus requests so software can later read the request and generate a trace of the sequence of events on the CMI 144.

The Level-2 cache memory controller 130 maintains memory reference coherence. It returns the latest copy of a memory block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers 133 supporting 32 gigabytes of DRAM. Preferably, each DRAM controller 133 supports a 64-bit interface to DRAM 108. Additionally, the DRAM controller 133 can support preferred protocols, such as the DDR-III protocol.

After a packet has been processed by the processor cores 120, the packet output unit 146 reads the packet data from the Level-2 cache memory 130/DRAM 108, performs L4 network protocol post-processing (e.g., generates a TCP/UDP checksum), forwards the packet through the interface units 122*a* and 122*b* or the PCIe interface 124 and frees the Level-2 cache memory 130/DRAM 108 used by the packet.

The DRAM Controllers 133 manage in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The HFA unit 160 is coupled directly to the DRAM Controllers 133 on a bypass-cache access path 135. The bypass-cache access path 135 allows the HFA unit to read directly from the DRAM memory 108 without using the Level-2 cache memory 130, which can improve efficiency for HFA operations.

In one embodiment, an Octeon 68XX network processor product, made by Cavium, Inc. of San Jose, Calif., includes DFA/NFA/HFA deep packet inspection engines within the HFA Unit 160. Forty-eight independent inspection engines may operate in parallel, each issuing read requests to DRAM Controllers 133. Read response data from the memory ports contains graph data that is combined with the current state of the inspection engines and compared to the current byte of the packet data to determine whether any necessary additional processing of the packet is necessary. Each inspection engine within the HFA Unit 160 processes one packet at a time. The frequency and occurrence of read requests from the HFA Unit 160 to the DRAM Controllers 133 are difficult to predict. Some graph data may be obtained from an internal cache in the HFA Unit 160 without having to access DRAM 108, but collisions with other inspection engines when accessing the internal cache may cause additional processing delays. In addition, an inspection engine may pre-maturely terminate packet processing before it reaches the end of the packet, further increasing unpredictability of the occurrence of read requests.

Performance of the deep packet inspection processing directly correlates with external DRAM 108 memory read latency. Once the HFA Unit 160 issues a read request to external memory, the HFA Unit 160 waits until the external memory returns a response before processing subsequent bytes of a packet because each inspection engine within the HFA Unit 160 processes one packet at a time. Reducing the latency of reading data from the external memory can improve HFA Unit 160 performance. Storing graph data at a plurality of the external memory ports allows the HFA Unit 160 to issue a read request that is directed to the memory port with the lowest latency containing the desired data.

Figure 2:
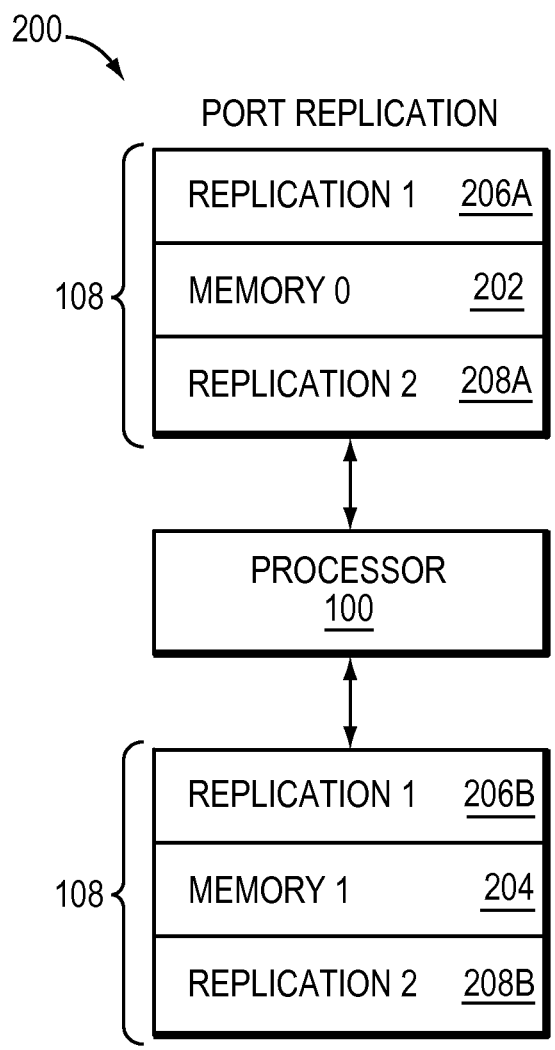
FIG. 2 is a block level diagram of memory replication across multiple memory ports accessible by a processor.

FIG. 2 is a block level diagram of memory replication across multiple memory ports accessible by a processor. Memory replication enabled processor 200 includes a plurality of memory ports 202, 204 of external DRAM 108 coupled with the network services processor 100. Each memory port 202, 204 can store a first set of replicated data 206A-B and a second set of replicated data 208A-B. For example, a first port of memory 202 stores the first set of replicated data 206A and the second set of replicated data 208A. A second port of memory 204 stores the first set of replicated data 206B and the second set of replicated data 208B. The first set of replicated data 206A is the same data as the first set of replicated data 206B, and the second set of replicated data 208A is the same data as the second set of replicated data 208B.

Figure 3:
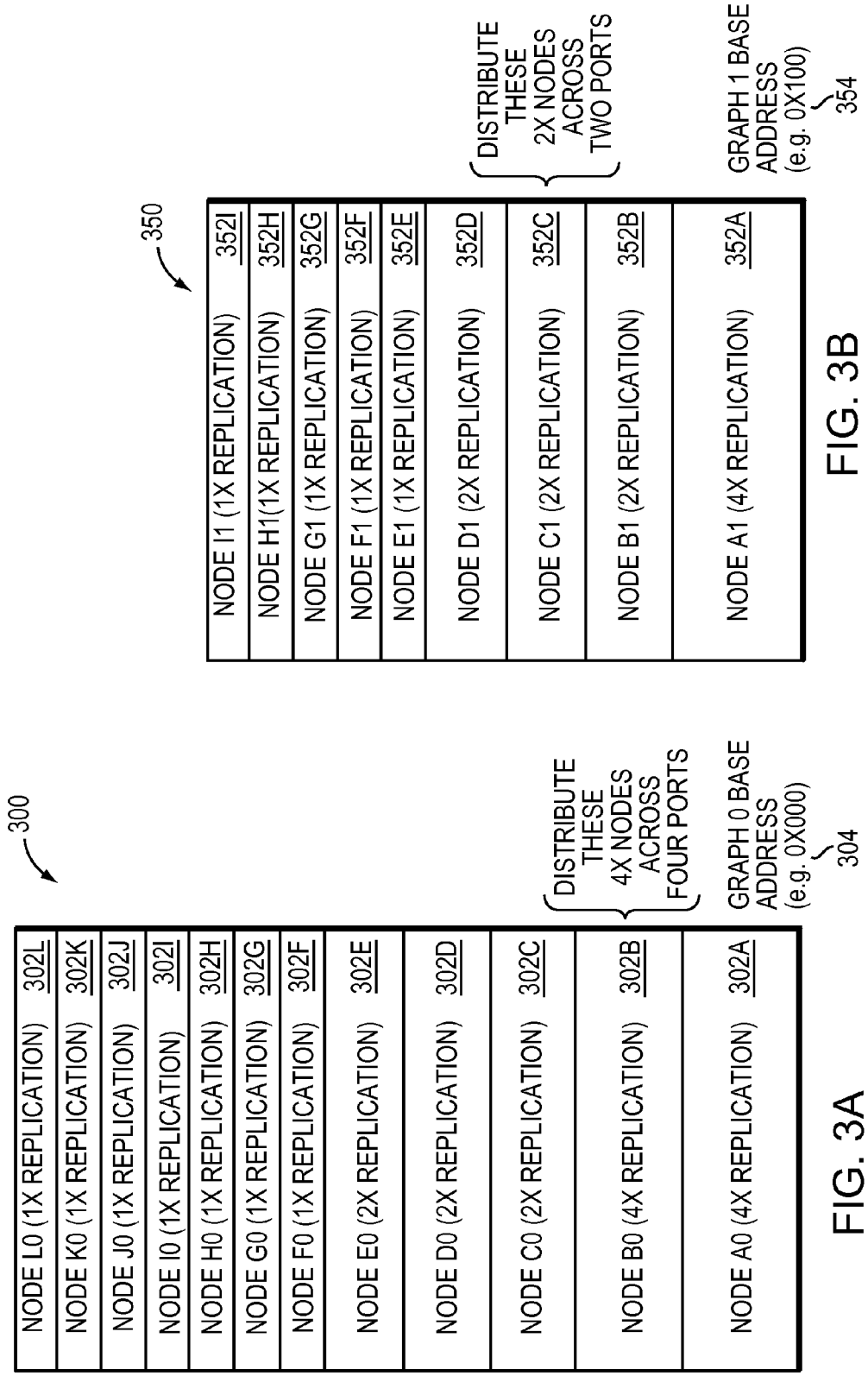
FIG. 3A is a representation of a graph in a virtual memory space. The virtual memory space stores a plurality of replicated graph data.
FIG. 3B is a representation of a graph in a virtual memory space. The virtual memory space stores a plurality of replicated graph data.

FIG. 3A is a representation of a graph in a virtual memory space 300. The virtual memory space 300 stores a plurality of replicated graph data 302A, 302B . . . 302L. Each replicated graph data 302A, 302B . . . 302L has a replication factor indicating how many times it needs to be replicated in the hardware memory. Each replicated graph data 302A, 302B . . . 302L is also replicated within the virtual memory space 300 according to its replication factor. The replicated graph data 302A, 302B . . . 302L begins at a base address of the graph 304 with graph data 302A and is addressed linearly in the virtual memory space 300. Software replicates graph data by creating the graph data 302A, 302B . . . 302L selectively multiple times into the virtual memory space 300 according to each graph data's replication factor. Each graph data 302A, 302B . . . 302L can be replicated a different amount of times according to each graph data's replication factor. For instance, graph data 302A has a replication factor of 4×, so it is replicated four times. However, graph data 302L has a replication factor of 1×, so it is only stored once.

FIG. 3B is a representation of a graph in a virtual memory space 350. The virtual memory space 350 stores a plurality of replicated graph data 352A, 352B . . . 352I. Each replicated graph data 352A, 352B . . . 352I has a replication factor indicating how many times it needs to be replicated in the hardware memory. Each replicated graph data 352A, 352B . . . 352I is also replicated within the virtual memory space 350 according to its replication factor. The replicated graph data 352A, 352B . . . 352I begins at a base address of the graph 354 with graph data 352A and is addressed linearly in the virtual memory space 350. Software replicates graph data by creating the graph data 352A, 352B . . . 352I selectively multiple times into the virtual memory space 350 according to each graph data's replication factor.

Referring to FIG. 3A and FIG. 3B, software writes graph data 302 and graph data 352 to hardware memory. Software stores each graph data 302 and graph data 352 in virtual memory space 300 and virtual memory space 350 so that virtual memory space 300 and virtual space 350 are each written to hardware memory once, respectively. The replicated virtual copies therefore translate into replicated hardware memory copies, where each copy is on a separate hardware memory port. Therefore, hardware does not assist with replicating write transactions.

Figure 4:
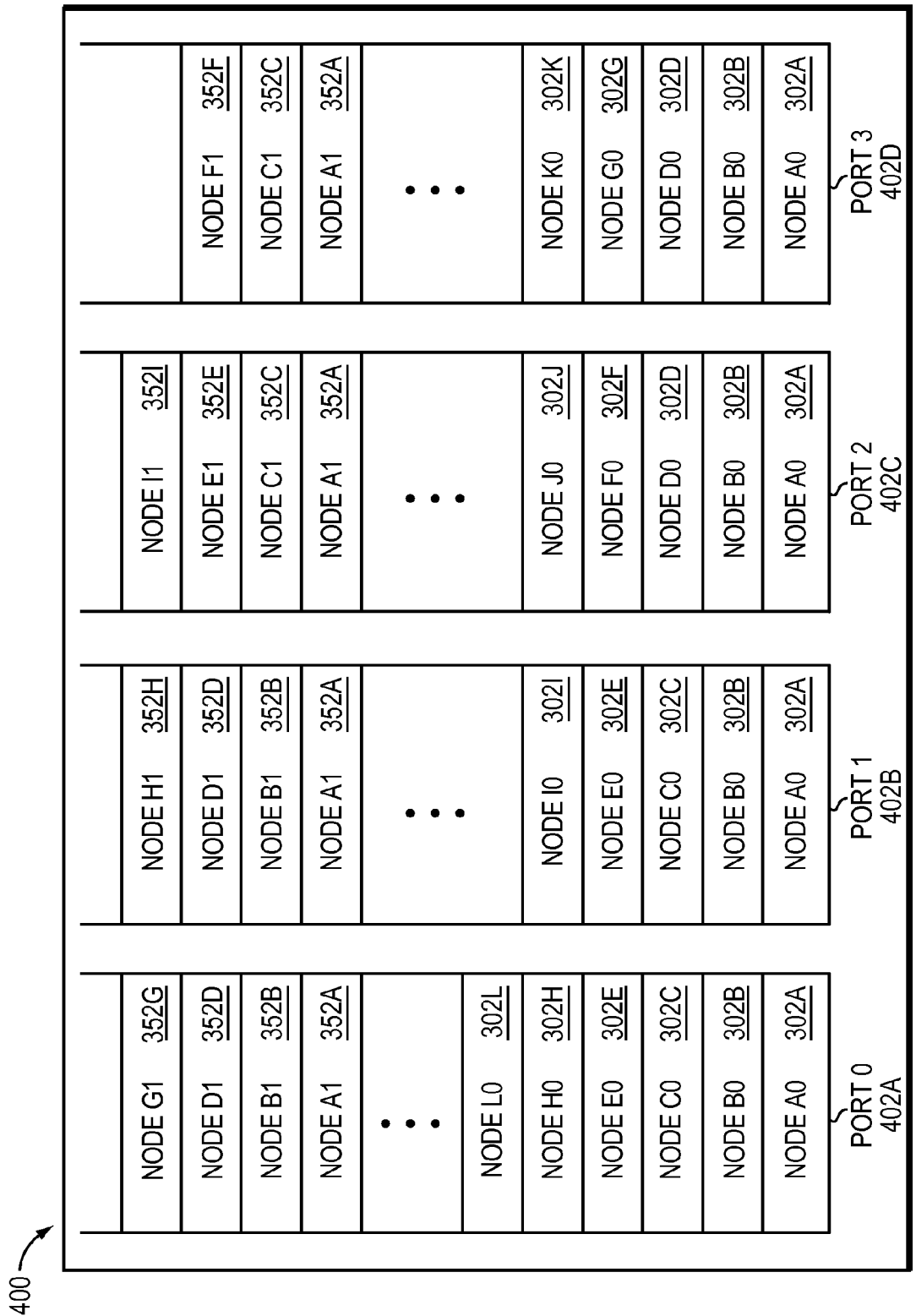
FIG. 4 is a representation of a plurality of graphs in hardware memory space.

FIG. 4 is a representation of a plurality of graphs in a hardware memory space 400. Hardware memory space 400 includes a plurality of memory ports 402A-D. Hardware memory space 400 of each memory port contains portions of graph data 302A-L and 352A-I. The graph data 302A-L, 352A-I is replicated according to each graph data's replication factor. For example, FIG. 3A indicates that graph data 302A (Node A0) has a replication factor of 4×. Accordingly, in FIG. 4, graph data 302A (Node A0) is replicated four times and is stored in memory ports 402A-D. As another example, FIG. 3A indicates that graph data 302C (Node C0) has a replication factor of 2×. Likewise, in FIG. 4, graph data 302C (Node C0) is replicated twice and stored in memory ports 402A-B. As yet another example, FIG. 3A indicates graph data 302F (Node F0) has a replication factor of 1×. Likewise, in FIG. 4, graph data 302F (Node F0) is replicated only once: in memory port 402C.

The graph data 302, 352 that has a replication factor of 2× or 4× has the same relative addressing across the plurality of memory ports 402. For example, graph data 302A (Node A0) is in the same relative location across memory ports 402A-D. In addition, graph data 352A (Node A1) is in the same relative location across memory ports 402A-D. Even graph data with replication factors less than 4×, such as graph data 302C, which has a replication factor of 2×, are in the same relative location across the memory ports 402A-B. Likewise, graph data 302D, which also has a replication factor of 2×, is in the same relative location across memory ports 402C-D.

Graph data 302 with a 4× replication factor is stored at the same relative address on each of the ports 402A-D. Graph data 302 with a 2× replication factor is stored at the same relative address on either ports 402A and 402B or 402C and 402D. Graph data with a 1× replication factor can be stored at any one of the memory ports 402A-D. Graph data with a 1× replication factor does not have the same relative addressing across memory ports since, by definition, it is not replicated.

The virtual memory space stores graph data 302 with the highest replication factors at the lowest addresses, starting at the base address 304, and graph data with the lowest replication factors at the higher addresses within the virtual memory space 300. For example, software stores graph data 302A-B with a replication factor of 4× at the lower addresses of the graph's virtual memory space 300. Then, software stores graph data 302C-E with a replication factor of 2× at a higher relative location within the graph's virtual memory space 300. Last, virtual memory space 300 stores graph data 302F-L with a replication factor of 1× at an even higher relative location within the graph's virtual memory space 300.

Storing graph data 302 in this order ensures that a replicated graph data 302 always appears at the same relative address across all of the memory ports 402 where it is replicated. For example, replicated graph data 302 may be stored at address 0x40 of one port and address 0x40 of a second port. If the graph data is not ordered as "4×-2×-1×" as described above, a replicated node can appear at two different relative addresses of more than one port. For example, consider a graph with three 1× nodes followed by a single 2× node. In this scenario, the three 1× nodes are written to address N on ports 0, 1, and 2 (402A-C), respectively. Then, the one 2× node is written with the first copy at address N on port 3 (402D) and with the second copy at address N+1 on port 0 (402A). Reading the 2× replicated node from hardware memory may return incorrect data because the replicated nodes are not at the same relative address in the hardware memory. Therefore, storing replicated graph data 302 in a "4×-2×-1×" order can prevent such errors.

In one embodiment, the graph base address 304 should be aligned to begin storing data at either Port 0 or Port 3, depending on the type of address hashing function. For example, the virtual memory space 300 can start at hardware address 0x0. If the graph base address 304 is stored at an address other than 0x0, the alignment of data could cause replicated data to be stored at different relative addresses. For example, replicated data is stored at different relative addresses when the first replication copy of a 4× node is stored at Port 1, Port 2, and Port 3 on the same relative address, and the final copy is stored on Port 0, but at a different relative address than the first three copies. A person of ordinary skill in the art can recognize that other address hashing functions can be configured to keep replicated data across the same relative addresses with different starting alignments in memory.

In one embodiment, data is replicated in powers of two. For example, a system can replicate data four times, two times, or one time. However, a system can also replicate data eight times, 16 times, 32 times, or any other power of two. A person of ordinary skill in the art can recognize that data can be replicated by replication factors that are not powers of two as well. The system should have a number of memory ports equal to its highest replication factor. The system also should have an address hashing function configured to hash data across the number of memory ports. As is well known in the art, hashing functions can be simpler to design for replication factors that are powers of two.

FIG. 5A is a table illustrating a linear address space scheme 500 for storing a graph in software. The linear address space scheme 500 correlates a graph number 502 with a virtual memory address 504. Each virtual memory address 504 corresponding to a graph 502 leaves sufficient memory for the entire graph to be stored linearly in the virtual memory space, starting from the base virtual memory address 504 and ending before the base virtual memory address 504 of the next stored graph 502.

FIG. 5B is a table illustrating a conversion of a virtual memory address 552 to a memory port 554. Each address 552 corresponds to a single port 554. An address hashing unit, discussed in more detail below, modifies the virtual memory address to a hardware based memory address, distributing data across the plurality of memory ports. Software is unaware of any address translation between its virtual memory address and the actual hardware based address and port in main memory.

Without the hashing function, "hot spotting" may occur when the HFA Unit reads the graph data from memory. For example, the addresses in the table may place all first nodes at memory port 0. During graph walking, the HFA Unit may only have to access the first node of the graph for a majority of packets. In this "hot spotting" scenario, all graphs store their first node on the same memory port and the HFA Unit issues a disproportionate number of read requests to that same memory port. To prevent such "hot spotting," an address hashing unit modifies the order data is distributed across the ports based on specific address bits of the virtual memory address. For example, in the address range from 0x0 to 0xFFF, the address hashing unit assigns incrementing ports to incrementing addresses, in a modular fashion. However, in the range of 0x1000 through 0x1FFF, the address hashing unit assigns decrementing ports to increasing addresses, in a modular fashion, as shown in table 550. Using this hashing method, if software assigns the first node of each graph with an address where the last two bits are zero (e.g. 0x0, 0x100, 0x200, 0x300), the address hashing unit load-balances the first node of each graph among the memory ports. A person of ordinary skill in the art can recognize that hashing functions may prevent "hot spotting," however.

Figure 6:
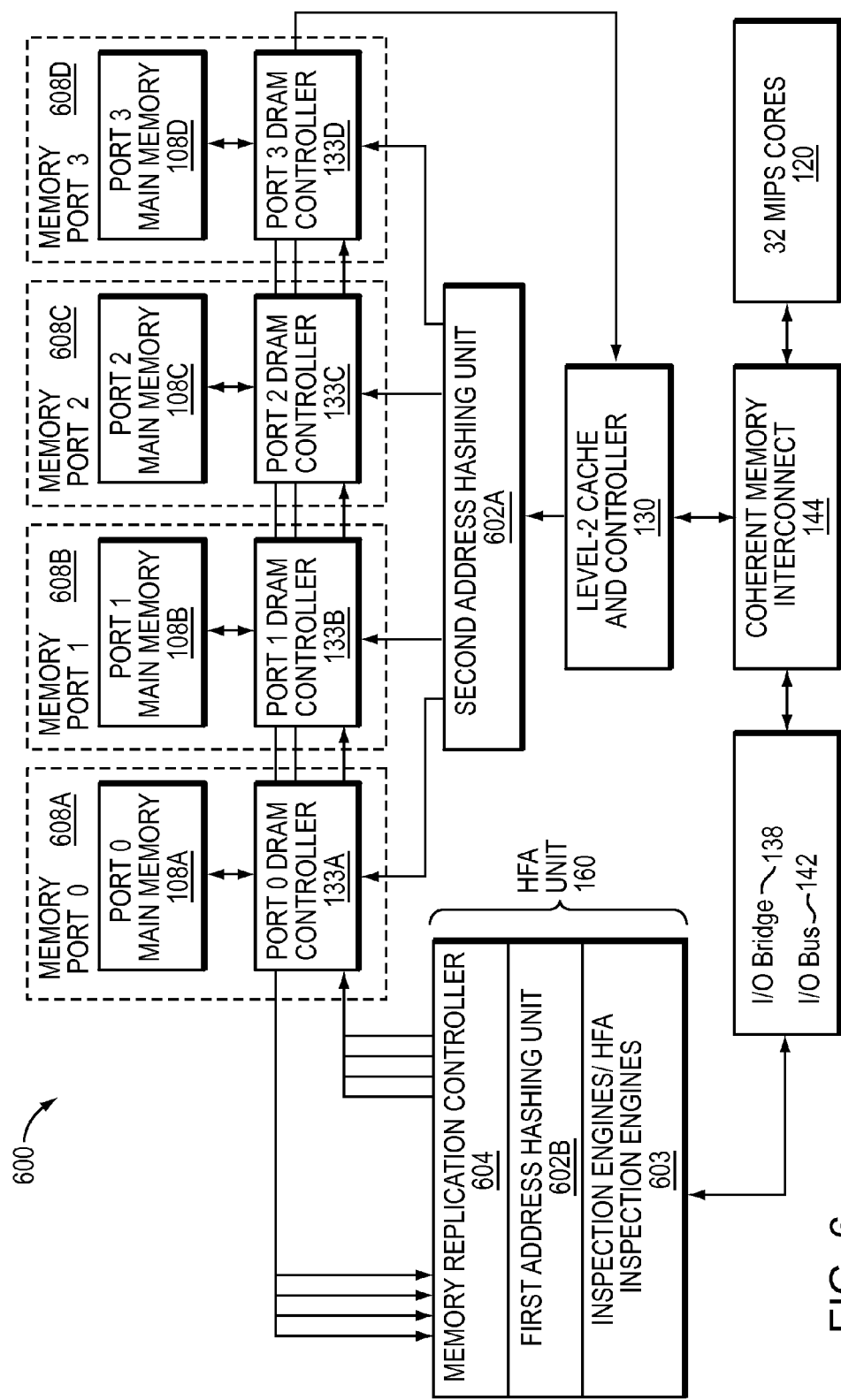
FIG. 6 is a block diagram of a processor with memory replication across multiple memory ports.

FIG. 6 is a block diagram of a processor arrangement 600 with memory replication across multiple memory ports 608A, 608B, 608C, and 608D. Each of the memory ports 608 includes a main memory 108 and a memory controller 133. A second address hashing unit 602A is operatively coupled to a Level-2 cache memory and controller 130. The Level-2 cache memory and controller 130 is configured to issue read and write requests to the plurality of memory ports 608 through the second address hashing unit 602A. Software writes graph data to the main memory through the Level-2 cache memory and controller 130. The second address hashing unit 602A distributes these software write requests to the plurality of memory ports 608. The second address hashing unit 602A receives a virtual memory address and generate a hardware based memory address and subset index that refers to only one memory port. The subset index can be 2 bits in systems where the maximum replication factor is 4× and 1 bit in systems where the maximum replication factor is 2×. When writing to data to memory, the subset index indicates one port of data to write the data to. In other words, when writing, the subset index only indicates one port, and the data is written to that one indicated port. In one embodiment, the subset indices generated during writing are analogous to the subset indices generated when the replication factor is set to 1×.

Software issues write commits to guarantee the Level-2 cache memory and controller 130 copies the graph data to the plurality of memory ports 608. In a hypothetical system where the software did not immediately commit writes of graph data to the plurality of memory ports 608, the non-committed written data remains in the Level-2 cache memory and controller 130. Such a hypothetical system is undesirable because a first address hashing unit 602B may read out-of-date or bad data from the plurality of memory ports 608 as the first address hashing unit 602B issues read requests directly to the plurality of memory ports 608 and does not issue read requests through the Level-2 cache memory and controller 130.

The Level-2 cache memory and controller 130 can read replicated graph data and other types of data stored in memory, such as packet data. The second address hashing unit 602A is not typically coupled with a memory replication controller 604 because the Level-2 cache memory and controller 130 issues read requests directly to the hardware memory address of the data it wants to read. The read request is "hard wired" with a replication factor of 1× such that a read request along the Level-2 cache memory and controller 130 path reads from a specific memory port 608. When writing to the memory ports 608, the second address hashing unit 602A distributes the graph data among the memory ports 608.

Write requests to addresses of a memory port 608 need to not be re-ordered in regards to read requests to the same addresses of the same memory port 608 to maintain data coherency. Write requests need to also not be re-ordered among each other. The data stored in the main memory 108 may become unknown or be in an unintentional state if write requests are re-ordered or read requests are re-ordered in relation to write requests.

Software determines the replication factors of graph data nodes based on predictions or assumptions of the frequency the HFA Unit 160 requests access to each graph node during packet processing. Software then writes the graph data to the memory ports 608 by explicitly repeating writes of graph data replicated in the virtual memory space to the memory ports 608. Writing graph data to the memory ports 608 is infrequent compared to the frequency the HFA Unit 160 requests to read graph data. Software should halt or terminate the reading of a graph by the HFA Unit 160 before it updates or writes to the graph data existing in main memory 108. Software halts the reading of the graph to prevent the HFA Unit 160 from reading out-of-date graph information from the same graph that software is updating.

The HFA Unit 160 includes a plurality of inspection engines 603, the first address hashing unit 602B and the memory replication controller 604. The HFA unit 160 is operatively coupled with an I/O Bus 142, which itself is coupled with an I/O Bridge 138. The I/O Bridge 138 is coupled with a coherent memory interconnect (CMI) 144. The CMI 144 is coupled with a plurality of cores 120 and with the Level-2 cache memory and controller 130.

Figure 7:
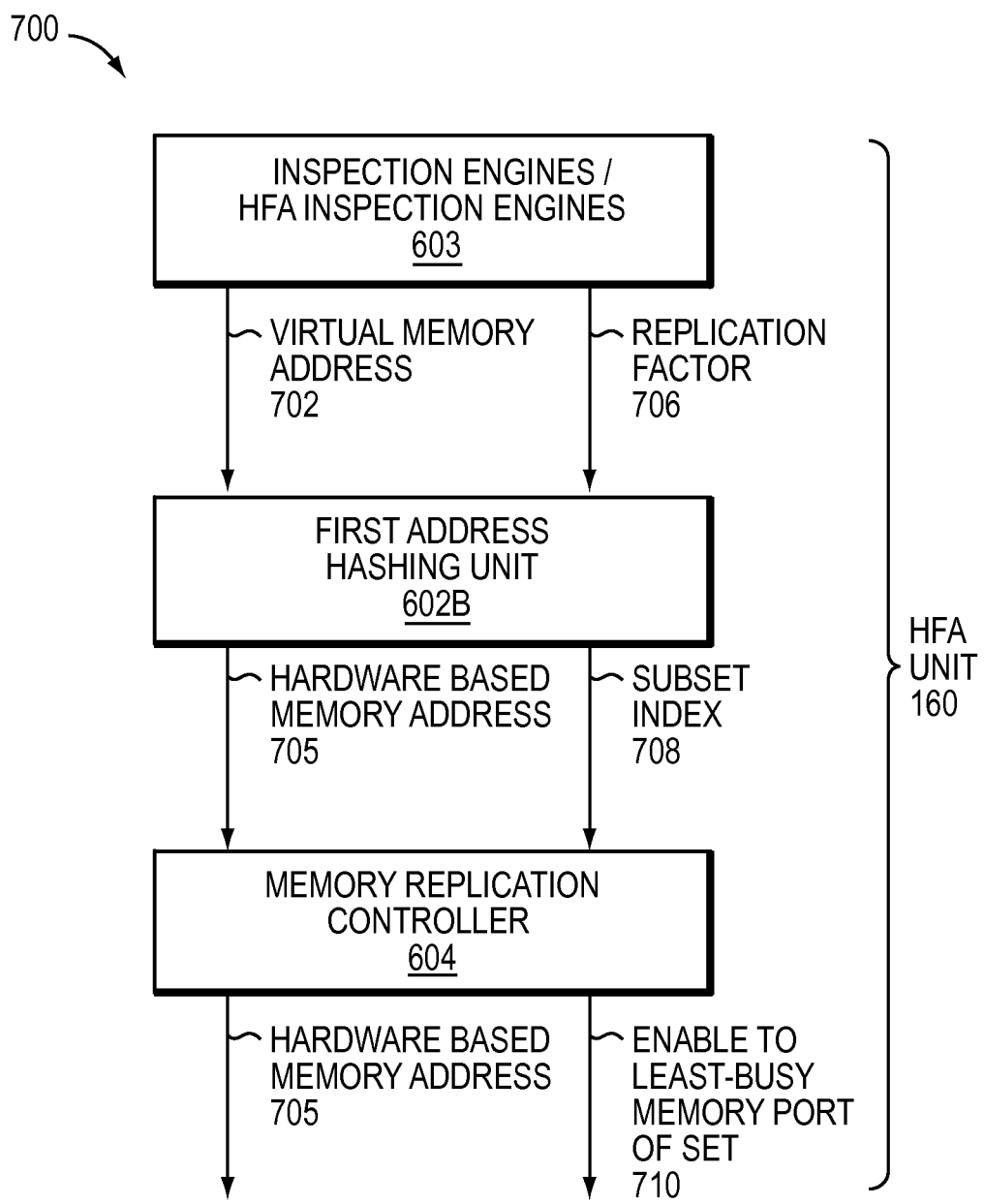
FIG. 7 is a block diagram of a HFA unit, including a plurality of inspection engines, a first address hashing unit, and a memory replication controller.

The HFA Unit 160 is configured to issue read requests for graph data to the first address hashing unit 602B. FIG. 7 details how the HFA Unit 160 issues read requests to the first address hashing unit. The first address hashing unit 602B and memory replication controller 604 read the requested data from the plurality of memory ports 608 and return the data to the HFA unit 160. A graph data node read from the memory ports 608 may contain information which the HFA unit 160 may use to generate a pointer to the next graph data node, if applicable, which software programmed into the graph during the graph's creation. As the HFA Unit 160 walks the graph, the first address hashing unit 602B hashes the pointer to the next graph data node and a replication factor to a hardware based memory address that points to the data in the memory ports 608.

The plurality of memory ports 608 may be distributed into subsets, with each memory port belonging to at least one subset. A subset may contain the set of all memory ports 608. The address hashing units 602 and memory replication controller 604 know the memory ports 608 corresponding with each subset. In one embodiment, S1, S2, S3, S4, S5, and S6 and S7 represent seven subsets in a system with four memory ports 608A-D. S1 includes all memory ports, 608A-D. S2 and S3 both include two memory ports, with S2 including memory ports 608A-B and S3 including memory ports 608C-D. S4, S5, S6, and S7 include one memory port, with S4 including 608A, 55 including 608B, S6 including 608C, and S7 including 608D. In another embodiment, S1, S2, and S3 represent three subsets in a system with only two memory ports 608A-B. S1 includes all memory ports 608A-B. S2 and S3 include one memory port, with S2 including 608A and S3 including 608B. A person of ordinary skill in the art should recognize other combinations of memory ports and subsets are possible.

The data stored on memory ports 608 does not have to be identical within a subset of memory ports. However, each data node stored in addresses accessible by the HFA unit 160 should be identical across the multiple memory ports 608 within the subset the node is stored. Data in the addresses within the memory ports 608 do not have to be identical across a given subset in address ranges the HFA Unit 160 is not configured to read from. However, in address ranges where the HFA Unit 160 is configured to read from, any replicated graph data node write request to a single memory port 608 of a subset also should be directed to corresponding locations of the memory ports within the subset to maintain replication across the subsets. A node replicated within a particular subset must be identical and located at the same hardware memory address for all memory ports of the particular subset.

FIG. 7 is a block diagram 700 of the HFA unit 160, including the plurality of inspection engines 603, the first address hashing unit 602B, and the memory replication controller 604. The inspection engines 603 issue a read request for graph data by transmitting a Virtual Memory Address 702 and a replication factor 706. In one embodiment, the Virtual Memory Address 702 is 38 bits and the replication factor 706 is two bits. The first address hashing unit 602B converts the Virtual Memory Address 702 into a hardware based memory address 705. As an illustrative example, the first address hashing unit 602B can use a modulo 4 or modulo 2 hashing function, for 4× and 2× maximum replication factors respectively, to convert the Virtual Memory Address 702 into a hardware based memory address 705. A person of ordinary skill in the art will appreciate that first address hashing unit 602B can use other hashing functions to convert a Virtual Memory Address 702 to a hardware based memory address 705.

The memory replication controller 604 determines how busy each memory port is by tracking the number of read requests sent to a memory port that remain unfulfilled. Each memory port 608 can have 0 to 16 unfulfilled memory read requests at one time. In some embodiments, the memory port 608 with the fewest unfulfilled memory requests has the lowest read latency.

As an illustrative example, the inspection engines 603 within the HFA Unit 160 issue requests to the memory ports 608 through the first address hashing unit 602B and memory replication controller 604 and the memory ports 608 and the inspection engines 603 within the HFA Unit 160 handle the requests as follows:

First, the inspection engines 603 within the HFA Unit 160 issue a read request (#N) with a first virtual memory address 702 and a replication factor 706 of 4×. Then, the first address hashing unit 602B converts the first virtual memory address 702 to a hardware based memory address 705. The first address hashing unit 602B further converts bits of the first virtual memory address 702 and the replication factor 706 into subset S1. When the replication factor is less than 4× in a four port memory system, however, the first address hashing unit 602B calculates the subset index 708 based on the virtual memory address 702.

Next, the memory replication controller 604 receives the read request (#N) with the first hardware based memory address and the subset index of S1. The memory replication controller 604 determines memory port 608B is the least busy of the memory ports in Subset S1 608A-D because memory port 608B has the lowest number of unfulfilled memory read requests. Therefore, the memory replication controller 604 issues the read request by selecting the connection to memory port 608B.

Next, the data for the read request (#N) is returned to the HFA unit 160. The inspection engines 603 apply the data from the read request (#N) and issue another read request (#N+1) with a second virtual memory address and a replication factor of 2×. Again, the first address hashing unit 602B converts the second virtual memory address 702 to a hardware based memory address 705. Based on bits of the virtual memory address and the replication factor 706, the first address hashing unit 602B determines the subset index is S3.

Next, the memory replication controller 604 receives the read request (#N+1) with the hardware based memory address and the subset index of S3. The memory replication controller 604 determines memory port 608C is the least busy of the memory ports in Subset S3 608C-D because memory port 608C has a lower number of unfulfilled memory read requests. Therefore, the memory replication controller 604 issues the read request by selecting the connection to memory port 608C. This process continues indefinitely, and the plurality of inspection engines 603 within the HFA unit 160 can operate in parallel.

FIG. 8A, with reference to FIG. 6, is a table 800 illustrating the hashing function of the first address hashing unit 602B and the second address hashing unit 602A with four memory units attached when applied to a specific virtual memory address. The first and second address hashing units 602 are configured to use the same hashing function. In one embodiment, the first and second address hashing units 602 perform an exclusive-OR operation on selected bits of the Virtual Memory Address. One embodiment of such an operation includes the following exclusive-OR operation:

Virtual Memory Address[8:7] XOR Virtual Memory Address[19:18] XOR Virtual Memory Address [13:12], where Virtual Memory Address[8:7] represents the 8th and 7th bits of the Virtual Memory Address, Virtual Memory Address[19:18] represents the 19th and 18th bits of the Virtual Memory Address, and Virtual Memory Address [13:12] represents the 13th and 12th bits of the Virtual Memory Address. This exclusive-OR operation results in a modified Virtual Memory Address[8:7]. Alternatively, another embodiment of the hashing function includes simply copying Virtual Memory Address[8:7] to use as the modified address.

As shown by the table in FIG. 8A, when the replication factor 802 is 4×, the bits [8:7] of the modified Virtual Memory Address 804 are irrelevant. The subset index 806 is always S1, which means there are four eligible memory ports 808. When the replication factor is 2×, only one bit of the modified Virtual Memory Address 804 affects the subset selection. Two subsets are available for selection in 2× replication mode, S2 and S3. With reference to FIG. 6 as well as FIG. 8A, S2 includes memory ports 0 and 1 608A-B, and S3 includes memory ports 2 and 3 608C-D. When the replication factor is 1×, bits 8 and 7 of the modified Virtual Memory Address 804 affect the subset selection. Four subsets are available in 1× mode, where S4 includes memory port 0 608A, S5 includes memory port 1 608B, S6 includes memory port 2 608C and S7 includes memory port 3 608D.

FIG. 8B, with reference to FIG. 6, is a table 850 illustrating the hashing function of the first address hashing unit 602B and the second address hashing unit 602A with two memory ports attached when applied to a specific virtual memory address. The first and second address hashing units 602 are configured to use the same hashing function. In one embodiment, the first and second address hashing units 602 perform an exclusive-OR operation on a selected bit of the Virtual Memory Address. One embodiment of such an operation includes the following exclusive-OR operation:

Virtual Memory Address[7] XOR Virtual Memory Address [18] XOR Virtual Memory Address [12], where Virtual Memory Address[7] represents the 7th bit of the Virtual Memory Address, Virtual Memory Address[18] represents the 18th bit of the Virtual Memory Address, and Virtual Memory Address [12] represents the 12th bit of the Virtual Memory Address. Alternatively, another embodiment of the address hashing function includes setting the modified address to Virtual Memory Address[7]. This exclusive-OR operation results in a modified Virtual Memory Address[7].

When the replication factor 852 is 2×, the bit [7] of the modified Virtual Memory Address 854 is irrelevant. There are two eligible memory ports 858 when the maximum replication factor is 2×. Referring to FIG. 6 as well as FIG. 8B, one subset 856 is available for selection in 2× replication mode, S1. S1 includes eligible memory ports 0 and 1 608A-B. When the replication factor 852 is 1×, bit [7] of the modified Virtual Memory Address 854 affects the subset selection 856. Two subsets 856 are available in 1× mode, where S2 includes eligible memory port 0 608 A, and S3 includes eligible memory port 1 608B.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
a plurality of memory ports, the plurality of memory ports distributed into a plurality of subsets, each subset identified by a subset index;
a first address hashing unit configured to receive a request including at least one virtual memory address, each virtual memory address associated with a replication factor, the virtual memory address referring to data, translate the replication factor into a corresponding subset index based on the virtual memory address, and convert the virtual memory address to a hardware based memory address, the hardware based address referring to data in at least one of the memory ports within a subset indicated by the corresponding subset index; and
a memory replication controller configured to direct requests to the hardware based address to the plurality of memory ports within the subset indicated by the corresponding subset index.

2. The system of claim 1, further comprising a second address hashing unit configured to receive a request for data including at least one virtual memory address, and to convert each virtual memory address to a hardware based memory address, the hardware based memory address referring to a separate one of the plurality of memory ports.

3. The system of claim 2, wherein the first address hashing unit is coupled to a plurality of inspection engines and a cache controller, wherein each inspection engine is configured to issue requests to the memory replication controller through the first address hashing unit and the second address hashing unit is coupled with the cache controller, wherein the cache controller is configured to issue requests to the plurality of memory ports through the second address hashing unit.

4. The system of claim 2, wherein the first and second address hashing units are configured to modify the order that virtual memory address requests are distributed across the plurality of memory ports.

5. The system of claim 2, wherein the plurality of memory ports is configured to store data in a hardware based memory address.

6. The system of claim 2, wherein the second address hashing unit is configured to convert any given virtual memory address to a predetermined hardware based memory address.

7. The system of claim 1, wherein the first address hashing unit is configured to convert any given virtual memory address to a predetermined hardware based memory address.

8. The system of claim 1, wherein each of the hardware based addresses referring to a separate one of the plurality of memory ports within a subset has a same relative address within each of the plurality of memory ports.

9. The system of claim 1, wherein the replication factor indicates a number of replications of a data structure in the plurality of memory ports.

10. The system of claim 1, wherein a number of replications is an exponential power of two.

11. The system of claim 1, wherein the replication factor of a given data is determined by a prediction of the frequency the given data will be read.

12. The system of claim 1, wherein within a given graph, data nodes with the same replication factor are stored in the virtual memory in a group of addresses and the data nodes are assigned virtual memory addresses in at least one of ascending and descending order according to their replication factor.

13. The system of claim 1, wherein a host or software has reserved sequential virtual memory addresses for each replication of a plurality of data.

14. The system of claim 1, wherein the subset index includes at least one of bits of the virtual memory address and modified bits of the virtual memory address to access the data in the plurality of memory ports.

15. The system of claim 1, wherein the memory replication controller is further configured to direct requests to the hardware based address to the plurality of memory ports within the subset indicated by the corresponding subset index based on at least one of an individual wait time and outstanding memory requests.

16. A method comprising:
distributing a plurality of memory ports into a plurality of subsets, each subset identified by a subset index;
receiving a request, at a first address hashing unit, with at least one virtual memory address and each virtual memory address associated with a replication factor, each virtual memory address referring to data;
translating, at the first address hashing unit, the replication factor into a corresponding subset index based on the virtual memory address;
converting, at the first address hashing unit, the virtual memory address to a hardware based memory address, the hardware based address referring to a separate one of the plurality of memory ports within a subset indicated by the corresponding subset index; and
directing requests, in a memory replication controller, to the hardware based address to the one of the plurality of memory ports.

17. The method of claim 16, further comprising:
receiving, at a second address hashing unit, a request for data including at least one virtual memory address,
converting, at the second address hashing unit, each virtual memory address to a hardware based memory address, the hardware based memory address referring to a separate one of the plurality of memory ports.

18. The method of claim 17, wherein the first address hashing unit is coupled with a plurality of inspection engines and a memory replication controller, wherein each inspection engine is configured to issue requests to the memory replication controller through the first address hashing unit, and the second hashing unit is coupled with a cache controller, wherein the cache controller is configured to issue read and requests to the plurality of memory controllers through the second address hashing unit.

19. The method of claim 17, wherein the first and second address hashing units are configured to modify the order virtual memory address requests are distributed across the plurality of memory ports.

20. The method of claim 17, wherein the plurality of memory ports is configured to store data in a hardware based memory address.

21. The method of claim 17, wherein within a given graph, a data node with the same replication factor are stored in the virtual memory in a sequential group of addresses and the data nodes are assigned virtual memory addresses in at least one of ascending and descending order according to their replication factor.

22. The method of claim 17, wherein the first and second address hashing units are configured to modify the order requests are distributed across the ports.

23. The method of claim 17, wherein the second address hashing unit is configured to convert any given virtual memory address to the same hardware based memory address.

24. The method of claim 16, wherein the first address hashing unit is configured to convert any given virtual memory address to the same hardware based memory address.

25. The method of claim 16, wherein each of the hardware based addresses referring to a separate one of the plurality of memory ports within a subset has a same relative address within each of the plurality of memory ports.

26. The method of claim 16, wherein the replication factor indicates a number of replications of a data structure in the plurality of memory ports.

27. The method of claim 16, wherein the replication factor is an exponential power of two.

28. The method of claim 16, wherein the replication factor of a given data is determined by a prediction of the frequency the given data will be read.

29. The method of claim 16, wherein the subset index includes at least one of bits of the virtual memory address and modified bits of the virtual memory address to access the data in the plurality of memory ports.

30. The method of claim 16, wherein the memory replication controller is further configured to direct requests to the hardware based address to the plurality of memory ports within the subset indicated by the corresponding subset index based on at least one of an individual wait time and outstanding memory requests.

* * * * *